United States Patent
Fujino

(10) Patent No.: US 8,588,177 B2
(45) Date of Patent: Nov. 19, 2013

(54) METHOD OF PERFORMING SESSION HANDOVER BETWEEN TERMINALS, NETWORK SYSTEM, AND PROGRAM

(75) Inventor: Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 1010 days.

(21) Appl. No.: 12/278,887

(22) PCT Filed: Jan. 23, 2007

(86) PCT No.: PCT/JP2007/051013
§ 371 (c)(1),
(2), (4) Date: Aug. 8, 2008

(87) PCT Pub. No.: WO2007/091421
PCT Pub. Date: Aug. 16, 2007

(65) Prior Publication Data
US 2010/0165946 A1    Jul. 1, 2010

(30) Foreign Application Priority Data
Feb. 8, 2006  (JP) ................................. 2006-031330

(51) Int. Cl.
*H04W 4/00*    (2009.01)
(52) U.S. Cl.
USPC ........... 370/331; 370/332; 370/329; 370/334; 455/436; 455/439; 455/442
(58) Field of Classification Search
USPC ......... 370/220, 241, 328, 331, 338, 329, 351, 370/392, 401; 455/445, 432, 433, 437, 455/404.1, 432.1, 560
See application file for complete search history.

(56) References Cited

U.S. PATENT DOCUMENTS

| | | | |
|---|---|---|---|
| 2002/0080752 A1* | 6/2002 | Johansson et al. | 370/338 |
| 2004/0122954 A1 | 6/2004 | Shaheen | |
| 2004/0151186 A1* | 8/2004 | Akama | 370/395.3 |
| 2005/0128979 A1* | 6/2005 | Wu et al. | 370/331 |
| 2006/0029020 A1* | 2/2006 | Jung et al. | 370/331 |
| 2006/0059264 A1* | 3/2006 | Leung et al. | 709/227 |
| 2006/0239266 A1* | 10/2006 | Babbar et al. | 370/392 |
| 2009/0316623 A1* | 12/2009 | Pettersson et al. | 370/328 |

FOREIGN PATENT DOCUMENTS

| | | |
|---|---|---|
| CN | 1640074 A | 7/2005 |
| JP | 2002290445 A | 10/2002 |
| JP | 2004173274 A | 6/2004 |
| JP | 2005537765 A | 12/2005 |
| WO | 2006001197 A1 | 1/2006 |

OTHER PUBLICATIONS

Chinese Office Action for CN200780004629.1 issued Mar. 18, 2011.
International Search Report for PCT/JP2007/051013 mailed May 15, 2007.

* cited by examiner

*Primary Examiner* — Anez Ebrahim

(57) ABSTRACT

It is difficult to perform handover between mobile terminals. In addition, when a session handover is performed between terminals whose mobilities are managed by individual Mobile IP HAs, it is difficult for an IETF standard to normally treat an Uplink packet. A network system includes: a function 9 that manages bind information between terminals which are arranged in a network and are subjected to the control of a user; a function 5 that translates an address; a function 7 that performs encapsulation between HAs; and a function that is provided in a terminal and transmits the bind information and a handover trigger to the bind information management function 9.

8 Claims, 4 Drawing Sheets

METHOD OF PERFORMING SESSION HANDOVER BETWEEN TERMINALS, NETWORK SYSTEM, AND PROGRAM

TECHNICAL FIELD

The present invention relates to a method of managing mobilities of terminals in a mobile communication service, and more particularly, to a technique for switching a session during communication between different mobile terminals.

BACKGROUND ART

In the related art, when a session during communication is switched from a cellular terminal with a narrow wireless band to a WiMAX terminal with a wide wireless band, that is, when a handover is performed between terminals, the terminal subjected to the handover performs negotiation with a correspondent node according to a session protocol, such as an SIP. During this process, a new session using a new IP address is established.

The change of the IP address causes disconnection of the session during communication, as it is. However, a technique has been developed which provides a session layer such that an application does not recognize a change in IP address.

In recent years, a telecommunications standards organization has proposed the architecture of a PAN (Personal Area Network) including a mobile telephone with a subscriber identifier to a mobile network and a plurality of adjacent terminals that are connected to each other by a local area communication technique. The technique for performing a handover between the terminals is also applied to the PAN.

The current mobile telephone can use infrared communication or USB for connection to other adjacent terminals. Meanwhile, for example, WLAN, Bluetooth, or ZigBee is used for local area wireless connection to, for example, a personal computer.

In the Mobile IP technique defined by the IETF, a terminal has a home address HoA and a care-of address CoA, and is managed by a corresponding home agent HA. A Downlink packet transmitted to the terminal is intercepted by the home agent HA, encapsulated with the care-of address CoA, and then transferred to the terminal. In addition, an Uplink packet transmitted from the terminal is transmitted by reverse tunneling for encapsulation up to the HA or route optimization between the terminal and a CN, which is a correspondent node. The Mobile IP is classified into various protocols according to the CoA. For example, in IPv6, terminals have different CoAs, and in IPv4, the CoA is defined as a Co-located CoA.

For example, the following technique has been proposed. In a first data path between a home agent (HA) and a first foreign agent (FA), when a reservation for data flow between the HA and a wireless terminal is established and the wireless terminal is associated with a second FA, a second data path is established between the first FA and the second FA in order to support the quality of service, and data flow is transferred through the first and second data paths in order to maintain the quality of service. A wireless communication network includes a first downstream and reverse tunnel that connects the HA and the first FA, and a reservation for maintaining the quality of service is established for each tunnel. A second downstream and reverse tunnel connects the HA and the second FA. When a wireless terminal is handed over from the first FA to the second FA, some or all of the resources reserved by the first tunnel are shared by the second tunnel, thereby maintaining the quality of service in the wireless communication network (for example, refer to Patent Document 1).

Patent Document 1: Japanese Unexamined Patent Application Publication No. 2004-173274

DISCLOSURE OF THE INVENTION

Problem to be Solved by the Invention

However, the above-mentioned related art has the following problems.

As a method to continue a session during a handover between terminals, a method of providing a session layer allows an application to change the IP address without recognizing. However, in this case, the session layer needs to be provided so as to correspond to handover whenever each session is established, which is not suitable for general purpose. Therefore, it is preferable not to change the IP address.

When a handover is performed between mobile terminals, the following problems arise. When a session handover is performed between a terminal A and a terminal B whose mobilities are managed by corresponding mobile IP HAs, the destination of a Downlink packet from the HA is changed from the terminal A to the terminal B (NAT operation) in order to transmit the packet. In the case of an Uplink packet, since the terminal B is a source, a correspondent node with only the information of the terminal A cannot normally transmit the uplink packet.

The present invention has been made in order to solve the above problems, and an exemplary object of the present invention is to provide a system capable of performing a handover between mobile terminals.

Means for Solving the Problem

In order to achieve the object, according to an aspect of the present invention, a network system includes: a function that manages bind information between terminals which are arranged in a network and are subjected to a control of a user; a function that translates an address; a function that performs encapsulation between HAs; and a function that is provided in a terminal and transmits the bind information to the bind information management function and triggers a handover.

A terminal A is provided with a Mobile IP technique. In addition, the terminal A includes a local area communication interface and can be connected to an adjacent terminal B. The terminal A acquires connection information to a mobile network of an HA used by the terminal B through the interface. Meanwhile, when a user wants to perform a session handover to the terminal B during communication, the terminal A transmits a trigger for handover and bind information for the terminal B to the bind information management function.

The bind information management function is provided in a session management server and stores bind information between both addresses when an End-to-End session is established between the terminal A and a correspondent node. Meanwhile, when receiving the handover trigger from the terminal A, the bind information management function adds the information of the terminal B to the bind information, and stores the added information as handover management information. Then, the bind information management function transfers the handover management information to the HAs in the mobile networks of the two terminals A and B.

The address translation function rewrites a Destination IP Address in a Downlink direction and a Source IP Address in an Uplink direction to the terminal A or the terminal B with reference to the handover management information.

When an Uplink packet is received from the terminal B and there is a corresponding entry in the handover management information, the function that performs encapsulation between HAs performs encapsulation to transfer the packet to the HA in the mobile network of the terminal A.

Effect of The Invention

According to the above-mentioned aspect of the present invention, it is possible to perform a session handover between mobile terminals, a handover between terminals that does not need to correspond to each application without translating an IP address, and a handover between terminals that does not need to provide special functions to a terminal or an HA.

PREFERRED EMBODIMENTS FOR CARRYING OUT THE INVENTION

Hereinafter, a first exemplary embodiment of the present invention will be described in detail with reference to the accompanying drawings.

FIG. 1 is a diagram illustrating the structure of a network system according to the first exemplary embodiment. A terminal A1 is subscribed to the service of a mobile network 11, and includes a communication interface with the mobile network 11 and a local area communication interface with a terminal B2. The terminal A1 acquires bind information 17 of a terminal B through the local area communication interface.

The terminal B2 is physically located at a short distance from the terminal A1 and is subscribed to the service of a mobile network 12. In addition, the terminal B2 includes a communication interface with the mobile network 12 and a local area communication interface with the terminal A1.

A local area communication network connecting the terminal A1 and the terminal B2 is called a PAN (Personal Area Network) 10.

A CN (Correspondent Node) 3 is a communication partner terminal.

A session management server 8 and a home agent HA_A4 are installed in the mobile network 11 of the terminal A.

The session management server 8 is provided with a bind information management function 9 that stores handover management information 13.

The home agent HA_A4 is provided with an address translation function 5 that stores handover management information 14 transferred from the bind information management function 9.

A home agent HA_B6 is installed in the mobile network 12 of the terminal B.

The home agent HA_B6 is provided with an inter-HA encapsulating function 7 that stores handover management information 15 transferred from the bind information management function 9.

Next, the operation of this embodiment will be described in detail with reference to FIG. 2.

The terminal A1 is provided with a Mobile IP technique, and has a home address (HoA_A) A and a care-of address (CoA_A) a. The terminal A1 is managed by the home agent HA_A4 (address: X).

Similarly, the terminal B2 is provided with a Mobile IP technique, and has a home address (HoA_B) B and a care-of address (CoA_B) b. The terminal B2 is managed by the home agent HA_B6 (address: Y). During Uplink communication, the terminal B2 transmits packets by reverse tunneling to the home agent HA_B6 without performing route optimization.

For example, when the terminal A1 starts VoIP communication with the CN 3 (address: C1), the terminal A1 establishes an End-to-End session to the CN 3 through the session management server 8. In this case, session information (A and C1) of the terminal A1 and the CN 3 is stored as a portion of the handover management information 13 in the bind information management function 9 of the session management server 8.

When the user wants to subordinate the terminal B2 to the terminal A1 in order to continuously perform communication while maintaining the address of the terminal A1, the terminal A1 acquires, as bind information 17 of the terminal B, the address of the terminal B2 (home address: B, and care-of address: b) and the address (Y) of the home agent HA_B6 being used through the local area communication interface between the terminals.

When the user wants to perform a handover session during communication from the terminal A1 to the terminal B2, a trigger for the handover is transmitted to the bind information management function 9. In this case, the terminal A1 transmits bind information (A, B, X, and Y) for the terminal B2.

When receiving the handover trigger from the terminal A1, the bind information management function 9 adds the bind information for the terminal B2 to the session information, and stores it as handover management information 13 (A, B, X, Y, and C1). The bind information management function 9 transfers the information 13 to the home agents HA_A4 and HA_B6 whose addresses are acquired. Then, the home agents store the received information (14 and 15).

Flow of user data (Downlink)

A Downlink packet from the CN 3 (address: C1) to the terminal A1 (home address: A) is intercepted by the address translation function 5 of the home agent HA_A4, and the address translation function 5 detects that there is bind information of the terminal A1 and the CN 3 (A and C1) in the handover management information 14. Then, the address translation function 5 rewrites the destination to the home address B of the terminal B2 and then transmits the packet.

The packet whose destination is the home address B is transmitted to a sub-network of the home agent HA_B6, and then intercepted by the home agent HA_B6. The home agent HA_B6 encapsulates the packet with the care-of address CoA_B (b) of the terminal B2, and then transfers the packet to the terminal B2.

In this way, the session established between the terminal A1 and the CN 3 starts as a session between the terminal B2 and the CN 3.

Flow of user data (Uplink)

An Uplink packet from the terminal B2 (home address: B) to the CN 3 (address: C1) is encapsulated into a reverse tunneled packet to the home agent HA_B6 and then transmitted (16). In this case, the destination of an external header is the home agent HA_B6 (address: Y), and the source thereof is the terminal B2 (care-of address: b).

When receiving the encapsulated packet, the home agent HA_B6 detects that the packet is a reverse tunneled packet, and decapsulates the packet. Then, the home agent HA_B6 transmits the decapsulated packet to the inter-HA encapsulating function 7. The inter-HA encapsulating function 7 detects that there is bind information of the terminal B2 and the CN 3 (B and C1) in handover management information 15 and performs encapsulation such that a destination is the home agent HA_A4 (address: X) and a source is HA_B6 (address: Y) in order to transfer the packet to the home agent HA_A4. Then, the inter-HA encapsulating function 7 transfers the encapsulated packet.

When receiving the encapsulated packet, the home agent HA_A4 detects that the destination of an external header is its own address (X), and detects that there is bind information of the terminal B2 and the CN 3 (B and C1) in the handover management information 14 with reference to the source and the destination of an internal header. Then, the home agent HA_A4 decapsulates the packet and transmits the decapsulated packet to the address translation function 5.

The address translation function 5 rewrites the source to the home address A of the terminal A1 with reference to the stored handover management information 14, and transmits the packet to the CN 3.

In this way, the session established between the terminal A1 and the CN 3 starts as a session between the terminal B2 and the CN 3.

The bind information management function may be provided in any apparatus other than the session management server. For example, the bind information management function may be provided in the HA. In this case, the HA stores the address information of a communication partner establishing a session when the HA processes Downlink user data.

The bind information management function may be independently installed as a bind information management server. In this case, the bind information management function communicates with the session management server or the HA to acquire the address information of a communication partner that establishes a session.

In the above-described first exemplary embodiment, the terminal address of the PAN as viewed from a communication partner is fixed to the home address of the terminal A. Therefore, apparatus and function structures in the mobile network of the terminal A are asymmetrical with those in the mobile network of the terminal B. Similarly, when the terminal address is fixed to the home address of the terminal B, a session management server (including the bind information management function) may be installed in the mobile network of the terminal B, and the address translation function may be installed in the HA used by the terminal B. In this case, each HA is provided with both the address translation function and the inter-HA encapsulating function.

During the Uplink transmission of user data from the terminal B, multiple encapsulation may be performed such that a packet is routed to the HA of the terminal A through the HA of the terminal B, thereby omitting the inter-HA encapsulating function. However, the terminal B needs to have a mechanism to perform such special encapsulation.

Next, a second exemplary embodiment of the present invention will be described with reference to FIGS. 3 and 4. In the second exemplary embodiment, a 3GPP terminal 18 that is subscribed to the service of a 3GPP network 28 is physically located at a short distance from a WiMAX terminal 19 that is subscribed to the service of a WiMAX network 29, thereby forming a PAN 27.

The 3GPP terminal 18 is provided with a Mobile IP technique, has a home address (HoA_A) A and a care-of address (CoA_A) a. The 3GPP terminal 18 is managed by a home agent HA_A21 (address: X).

Similarly, the WiMAX terminal 19 is provided with a Mobile IP technique, and has a home address (HoA_B) B and a care-of address (CoA_B) b. The WiMAX terminal 19 is managed by a home agent HA_B23 (address: Y). During Uplink communication, the WiMAX terminal 19 transmits a packet by reverse tunneling to the home agent HA_B23 without performing route optimization.

For example, when the 3GPP terminal 18 starts communication such as VoIP with a CN 20 (address: C1), the 3GPP terminal 18 establishes an End-to-End SIP session to the CN 20 through an SIP Server 25. In this case, SIP session information (A and C1) of the 3GPP terminal 18 and the CN 20 is stored as a portion of the handover management information 30 in a PAN management function 26 of the SIP server 25.

When the user wants to subordinate the WiMAX terminal 19 to the 3GPP terminal 18 in order to continuously perform communication while maintaining the address of the 3GPP terminal 18, the 3GPP terminal 18 acquires, as bind information 34 of the WiMAX terminal, the address of the WiMAX terminal 19 (home address: B, and care-of address: b) and the address (Y) of the home agent HA_B23 being used through a local area communication interface between the terminals.

When the user wants to perform an SIP session handover during communication from the 3GPP terminal 18 to the WiMAX terminal 19, a trigger for handover is transmitted to the PAN management function 26. In this case, the 3GPP terminal 18 transmits bind information (A, B, X, and Y) for the WiMAX terminal 19.

When receiving the hand over trigger from the 3GPP terminal 18, the PAN management function 26 adds the bind information for the WiMAX terminal 19 to the SIP session information, and stores it as the handover management information 30 (A, B, X, Y, and C1). The PAN management function 26 transfers the information 30 to the home agents HA_A21 and HA_B23 whose addresses are acquired. Then, the home agents store the received information (31 and 32).

Flow of user data (Downlink)

A Downlink packet from the CN 20 (address: C1) to the 3GPP terminal 18 (home address: A) is intercepted by an address translation function 22 of the home agent HA_A21, and the address translation function 22 detects that there is bind information of the 3GPP terminal 18 and the CN 20 (A and C1) in handover management information 31. Then, the address translation function 22 rewrites the destination to the home address B of the WiMAX terminal 19 and then transmits the packet.

The packet whose destination is the home address B is transmitted to a sub-network of the home agent HA_B23, and then intercepted by the home agent HA_B23. The home agent HA_B23 encapsulates the packet with the care-of address CoA_B (b) of the WiMAX terminal 19, and then transfers the packet to the WiMAX terminal 19. In this way, the SIP session established between the 3GPP terminal 18 and the CN 20 starts as a SIP session between the WiMAX terminal 19 and the CN 20.

Flow of user data (Uplink)

An Uplink packet from the WiMAX terminal 19 (home address: B) to the CN 20 (address: C1) is encapsulated into a reverse tunneled packet up to the home agent HA_B23 and then transmitted (33). In this case, the destination of an external header is the home agent HA_B23 (address: Y), and the source thereof is the WiMAX terminal 19 (care-of address: b).

When receiving the encapsulated packet, the home agent HA_B23 detects that the received packet is a reverse tunneled packet, and decapsulates the packet. Then, the home agent HA_B23 transmits the decapsulated packet to the inter-HA encapsulating function 24.

The inter-HA encapsulating function 24 detects that there is bind information of the WiMAX terminal 19 and the CN 20 (B and C1) in handover management information 32 and performs encapsulation such that a destination is the home agent HA_A21 (address: X) and a source is HA_B23 (address: Y) in order to transfer the packet to the home agent HA_A21. Then, the inter-HA encapsulating function 24 transfers the encapsulated packet.

When receiving the encapsulated packet, the home agent HA_A21 detects that the destination of an external header is its own address (X), and detects that there is bind information of the WiMAX terminal 19 and the CN 20 (B and C1) in the handover management information 31 with reference to the source and the destination of an internal header. Then, the home agent HA_A21 decapsulates the packet and transmits the decapsulated packet to the address translation function 22.

The address translation function 22 rewrites the source to the home address A of the 3GPP terminal 18 with reference to the stored handover management information 31, and transmits the packet to the CN 20.

In this way, the SIP session established between the 3GPP terminal 18 and the CN 20 starts as an SIP session between the WiMAX terminal 19 and the CN 20.

Although the exemplary embodiments of the present invention have been described above, the present invention is not limited thereto, but various modifications and changes of the embodiment can be made without departing from the scope and spirit of the invention. For example, in the above-described embodiments, each apparatus may read and execute a program for implementing the functions of each user terminal and the session management server according to the above-described embodiments to perform the functions thereof. The program may be transmitted to another computer system through a computer readable recording medium, such as a CD-ROM or a magneto-optical disk, or by carrier waves through a transmission medium such as the Internet or a telephone line.

In the above-described embodiments, the system structure in which each user terminal and the session management server are individually connected is used, but the present invention is not limited thereto. For example, the present invention can be applied to a structure in which each function is implemented by one computer system and a structure in which each function is implemented by a plurality of apparatuses.

Figure 1:
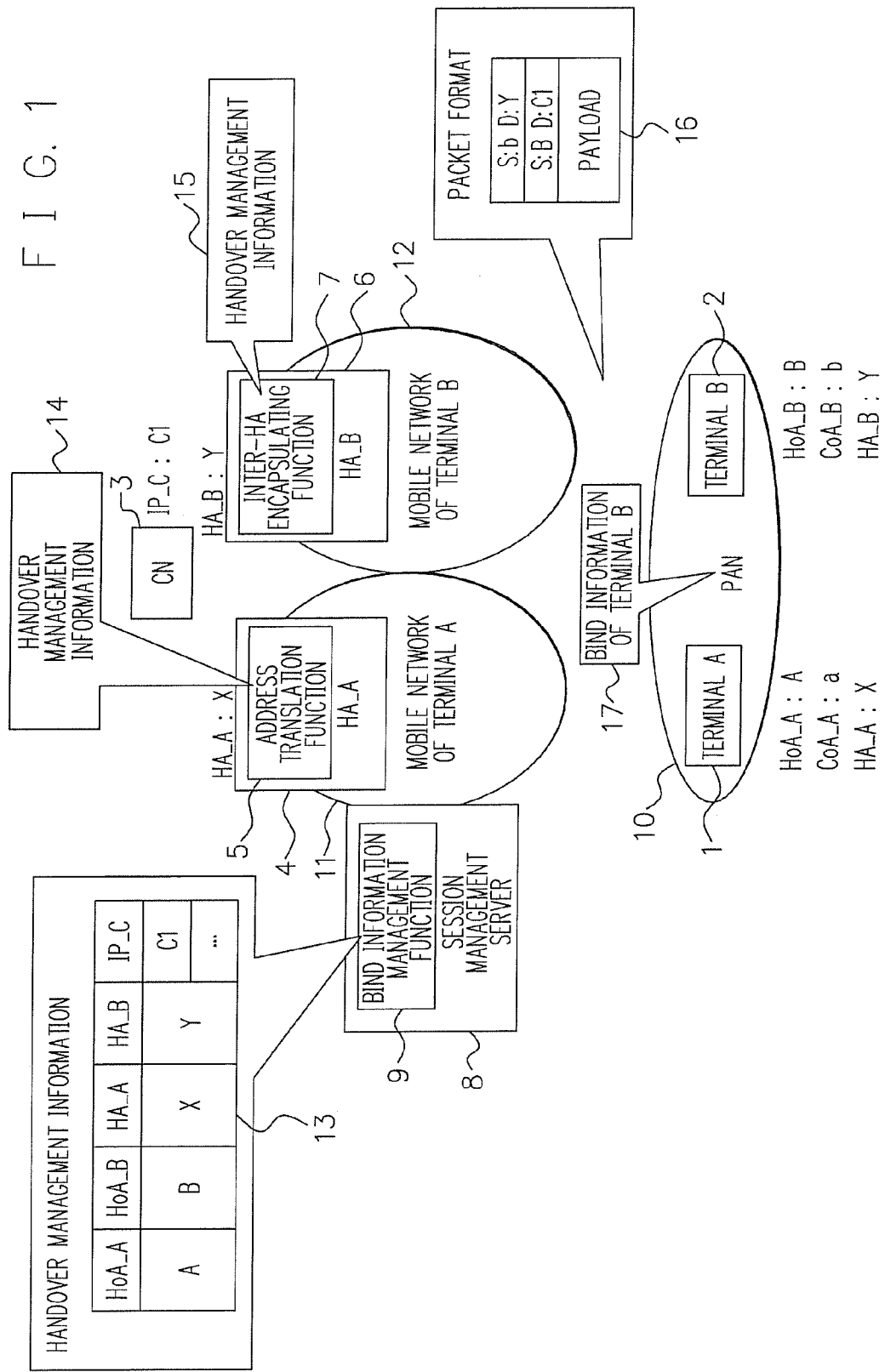
FIG. 1 is a diagram illustrating the structure of a network system according to a first exemplary embodiment of the present invention.
Figure 2:
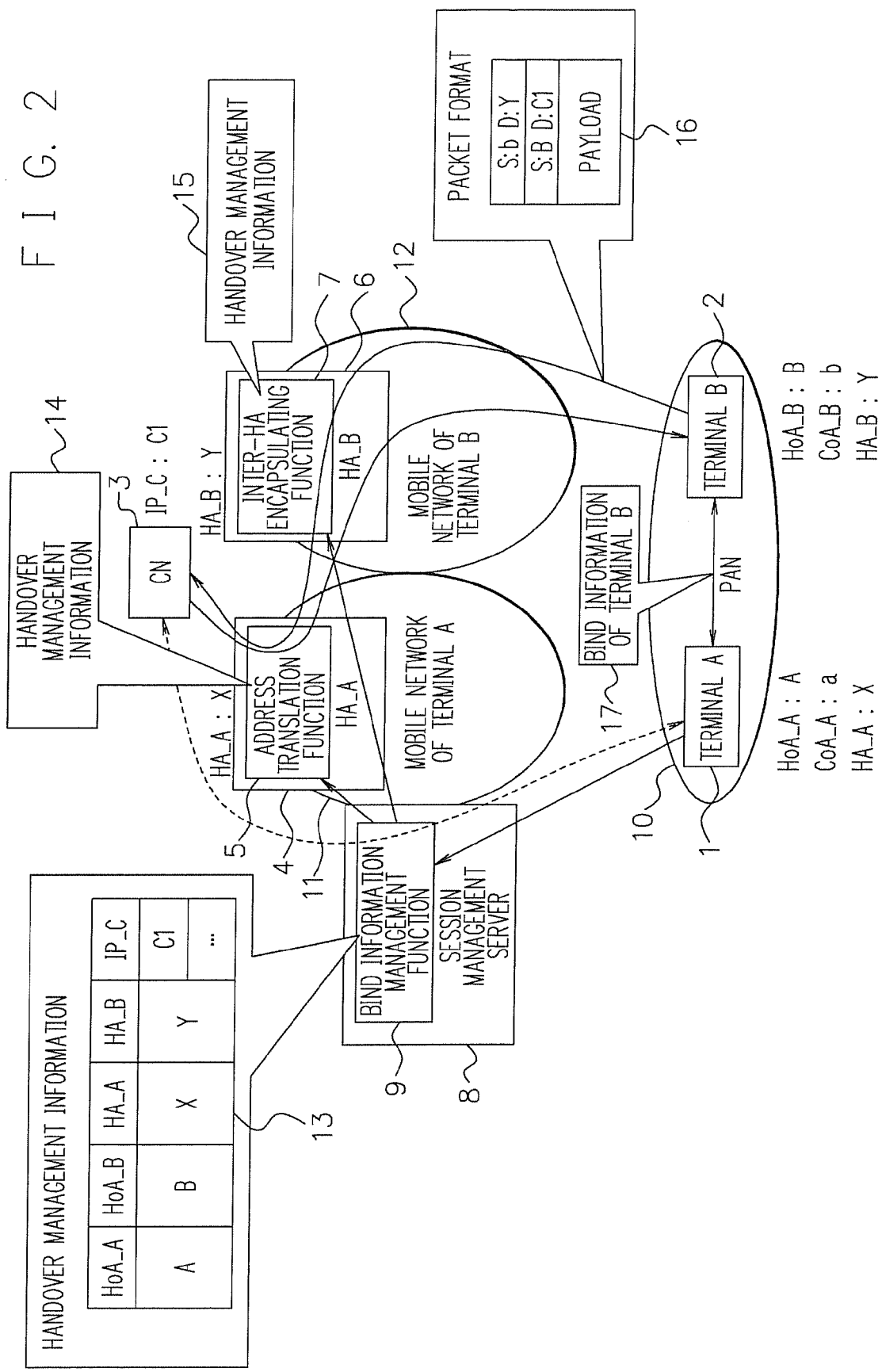
FIG. 2 is a diagram illustrating the processing operation of the first exemplary embodiment of the present invention.
Figure 3:
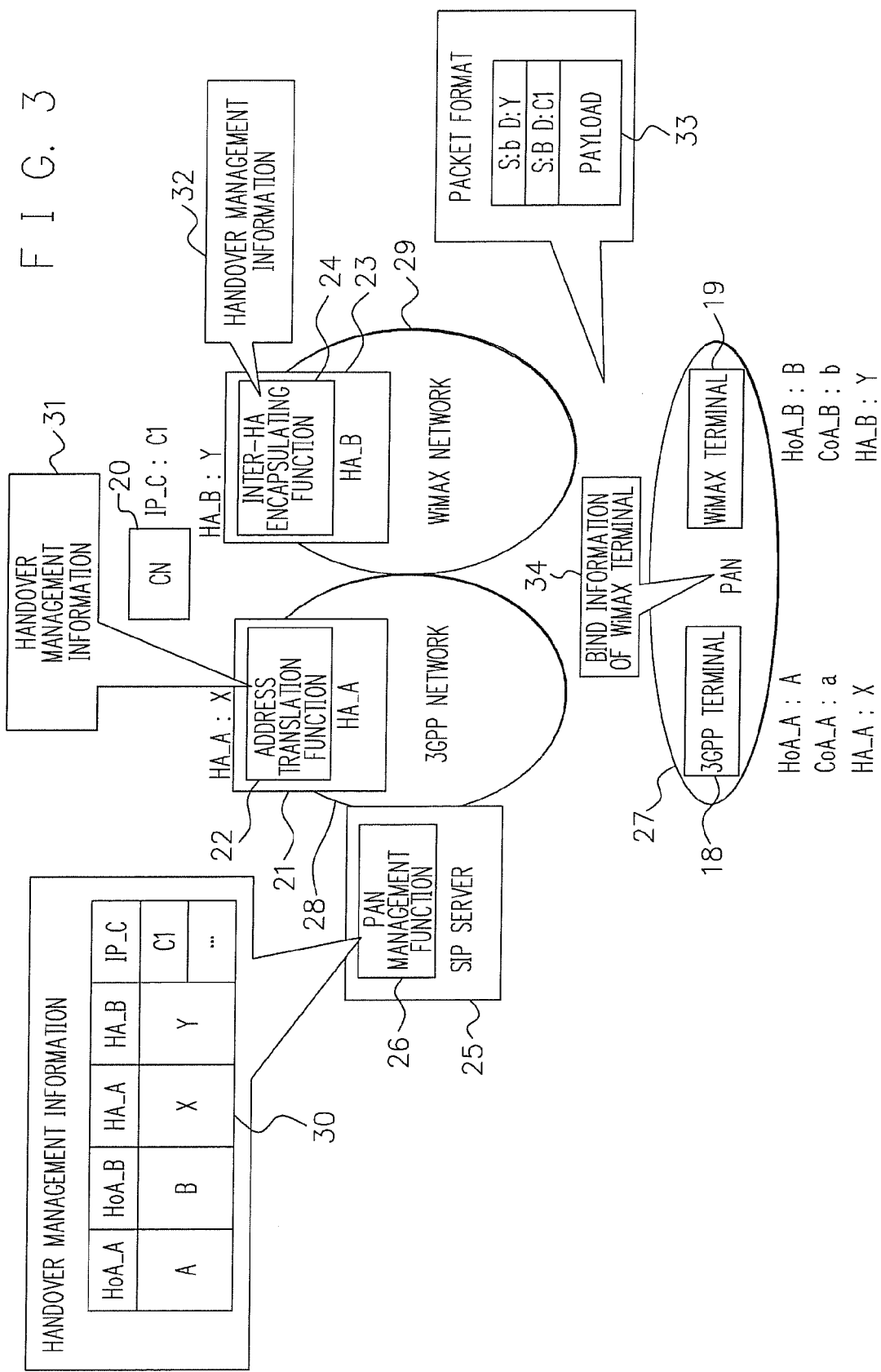
FIG. 3 is a diagram illustrating the structure of a network system according to a second exemplary embodiment of the present invention.
Figure 4:
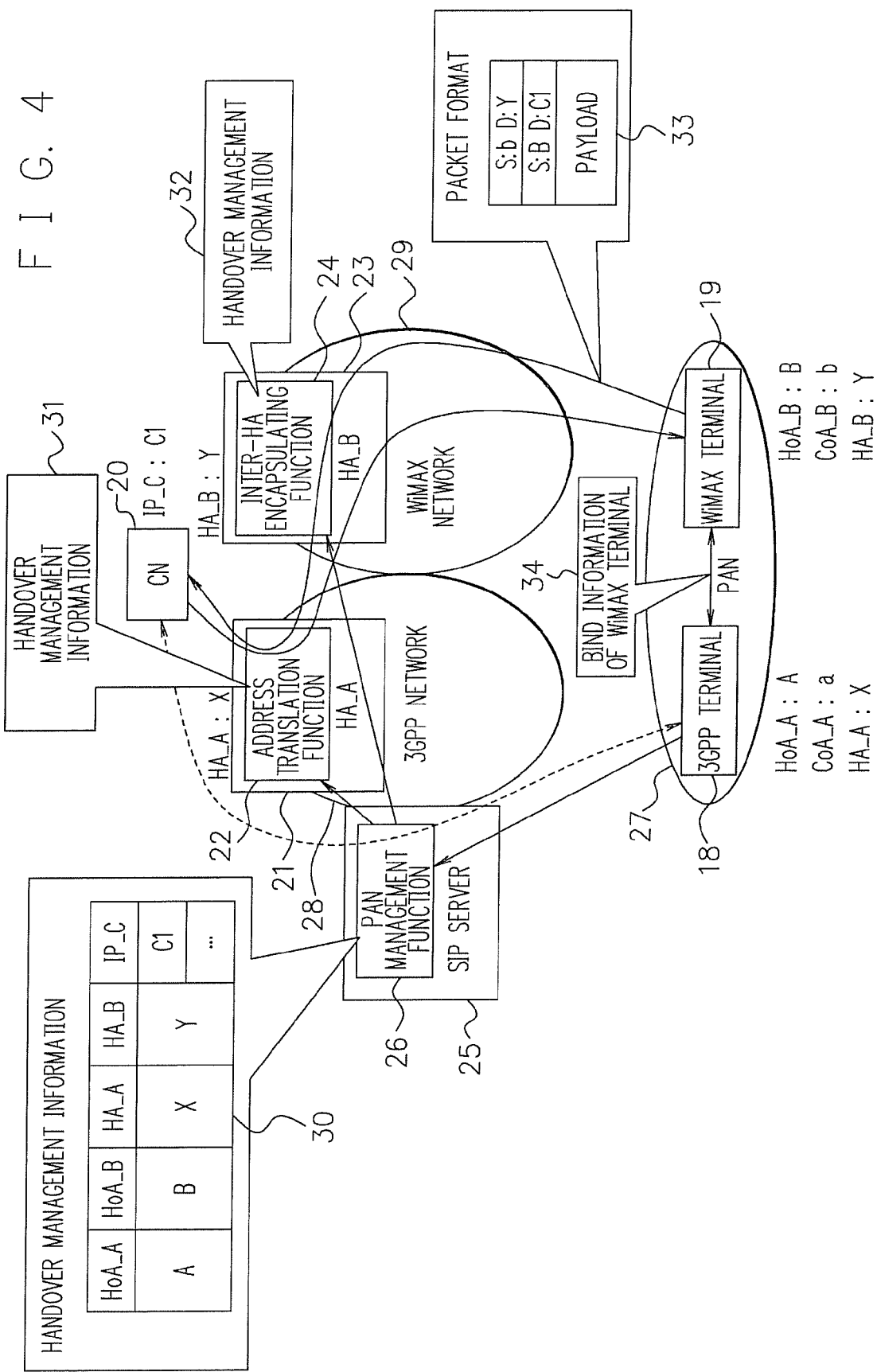
FIG. 4 is a diagram illustrating the processing operation of the second exemplary embodiment of the present invention.

REFERENCE NUMERALS 1, 2: USER TERMINAL
3, 20: CORRESPONDENT NODE TERMINAL
4, 6, 21, 23: HA (HOME AGENT)
5, 22: ADDRESS TRANSLATION FUNCTION
7, 24: INTER-HA ENCAPSULATING FUNCTION
8: SESSION MANAGEMENT SERVER
9: BIND INFORMATION MANAGEMENT FUNCTION
10, 27: PAN (PERSONAL AREA NETWORK)
11, 12: MOBILE NETWORK
13, 14, 15, 30, 31, 32: HANDOVER MANAGEMENT INFORMATION
16, 33: PACKET FORMAT DURING REVERSE TUNNELING
17: BIND INFORMATION OF TERMINAL
18: 3GPP TERMINAL
19: WiMAX TERMINAL
25: SIP SERVER
26: PAN MANAGEMENT FUNCTION
28: 3GPP NETWORK
29: WiMAX NETWORK
34: BIND INFORMATION OF WiMAX TERMINAL

The invention claimed is:

1. A method of performing a session handover between terminals managed by different mobilities, the method comprising:
managing, by a processing device, bind information between terminals that are arranged in a network and are to be controlled;
translating, by the processing device, an address;
performing, by the processing device, encapsulation between HAs (home agents) that are located in different networks; and
transmitting, by a terminal, the bind information to the processing device, thereby triggering a handover,
wherein the bind information includes addresses of the HAs and addresses of the terminals, and
wherein the terminal includes a unit that acquires connection information to a mobile network of an adjacent terminal and transmits the connection information, thereby triggering the session handover between the terminal and the adjacent terminal, during communication from the terminal and the adjacent terminal, while maintaining the address of the terminal.

2. A method of performing a session handover between terminals managed by different mobilities, the method comprising:
managing, by a processing device, bind information between terminals that are arranged in a network and are to be controlled;
translating, by the processing device an address;
performing, by the processing device, encapsulation between HAs (home agents) that are located in different networks; and
transmitting, by a terminal, the bind information to the processing device, thereby triggering a handover,
wherein the bind information includes addresses of the HAs and addresses of the terminals, and
wherein the managing includes storing bind information between both addresses when an End-to-End session is established between the terminal and a correspondent node or during the Downlink transmission of user data, adding information of an adjacent terminal, which is received from the terminal, to the bind information, storing the added information as handover management information, and transferring the handover management information to the HAs in the mobile networks of the two terminals.

3. The method of performing a session handover between terminals according to claim 2,
wherein the translating includes rewriting a destination IP address in a Downlink direction and a source IP address in an Uplink direction with reference to the handover management information.

4. The method of performing a session handover between terminals according to claim 2,
wherein the performing encapsulation includes performing encapsulation to transfer the packet to the HA in the mobile network of the terminal when an Uplink packet is received from the terminal and there is a corresponding entry in the handover management information.

5. A network system comprising:
a function that manages bind information between terminals which are arranged in a network and are subjected to a control of a user;
a function that translates an address;
a function that performs encapsulation between HAs (home agents) that are located in different networks; and
a function that is provided in a terminal and transmits the bind information to the bind information management function and that triggers a handover,
wherein the bind information includes addresses of the HAs and home addresses of the terminals, and
wherein the terminal includes a unit that acquires connection information to a mobile network of an adjacent terminal and transmits the connection information to the bind information management function, thereby triggering the session handover between the terminal and the adjacent terminal, during communication from the terminal and the adjacent terminal, while maintaining the address of the terminal.

6. A network system comprising:
a function that manages bind information between terminals which are arranged in a network and are subjected to a control of a user;
a function that translates an address;
a function that performs encapsulation between HAs (home agents) that are located in different networks; and
a function that is provided in a terminal and transmits the bind information to the bind information management function and that triggers a handover,
wherein the bind information includes addresses of the HAs and home addresses of the terminals, and
wherein the bind information management function includes a unit that, when an End-to-End session is established between the terminal and a correspondent node or during the Downlink transmission of user data, stores bind information between both addresses, adds information of an adjacent terminal, which is received from the terminal, to the bind information, stores the added information as handover management information, and transfers the handover management information to the HAs in the mobile networks of the two terminals.

7. The network system according to claim 6,
wherein the address translation function includes a unit that rewrites a destination IP address in a Downlink direction and a source IP address in an Uplink direction with reference to the handover management information.

8. The network system according to claim 6,
wherein the function that performs encapsulation between HAs includes a unit that performs encapsulation to transfer the packet to the HA in the mobile network of the terminal when an Uplink packet is received from the terminal and there is a corresponding entry in the handover management information.

* * * * *